Aug. 5, 1924.

E. K. BAKER 1,503,935

BICYCLE AND MOTOR DRIVE THEREFOR

Filed Sept. 2, 1919 4 Sheets-Sheet 1

Inventor:
Erle K. Baker
By Arthur M. Nelson
Atty.

Aug. 5, 1924.　　　　　　　　　　　　　　　　1,503,935
E. K. BAKER
BICYCLE AND MOTOR DRIVE THEREFOR
Filed Sept. 2, 1919　　　4 Sheets-Sheet 2

Inventor
Erle K. Baker
By Arthur W. Nelson
Atty.

Aug. 5, 1924.
E. K. BAKER
1,503,935
BICYCLE AND MOTOR DRIVE THEREFOR
Filed Sept. 2, 1919   4 Sheets-Sheet 3
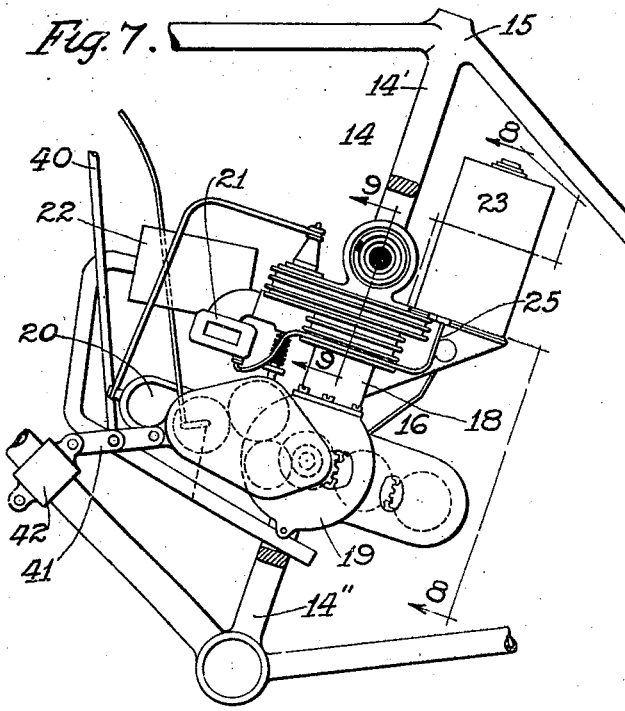
Inventor:
Erle K. Baker
By Arthur W. Nelson
Atty.

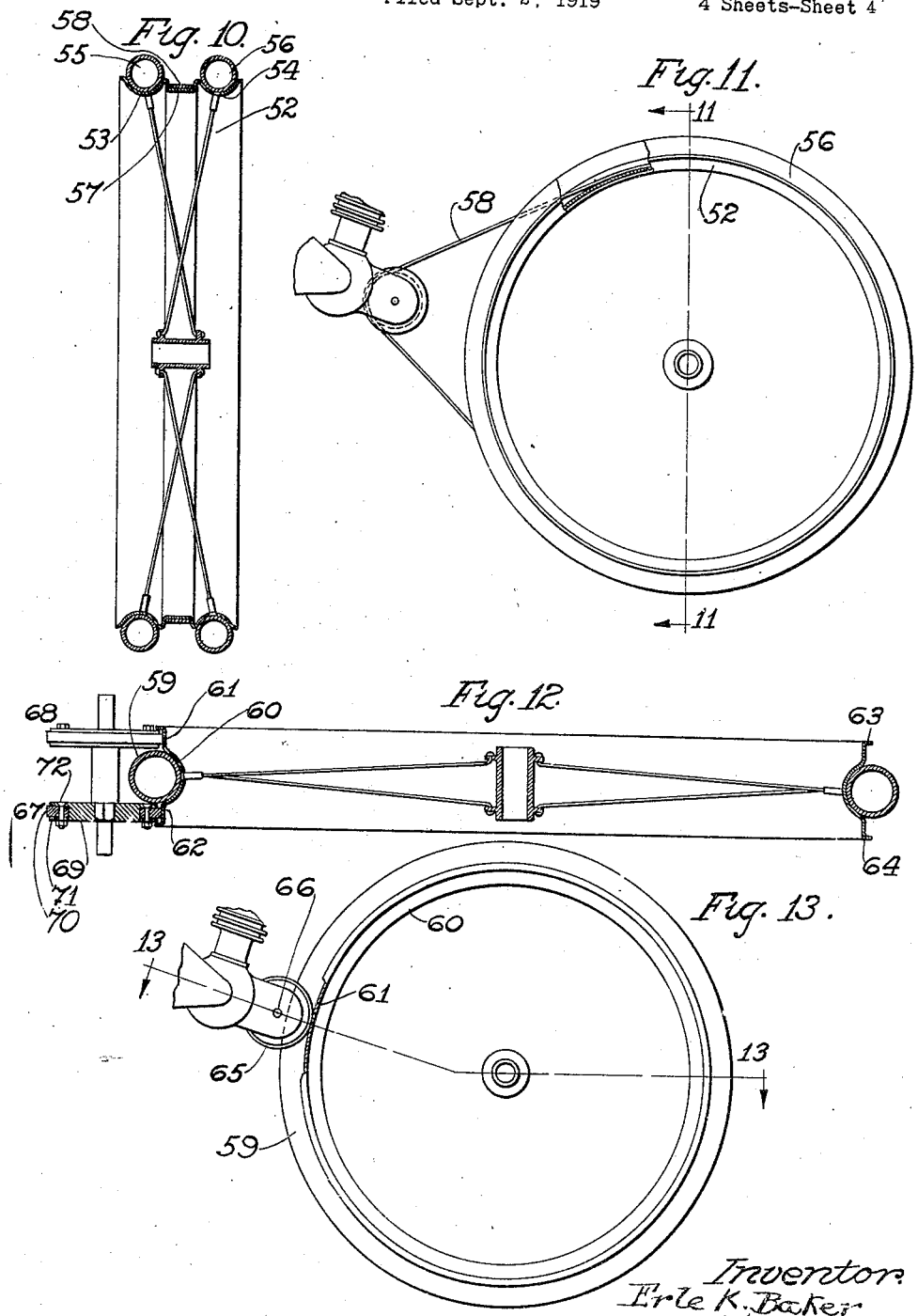

Patented Aug. 5, 1924.

1,503,935

UNITED STATES PATENT OFFICE.

ERLE K. BAKER, OF CHICAGO, ILLINOIS.

BICYCLE AND MOTOR DRIVE THEREFOR.

Application filed September 2, 1919. Serial No. 321,180.

*To whom it may concern:*

Be it known that I, ERLE K. BAKER, a citizen of the United States, and a resident of Chicago, Cook County, Illinois, have invented certain new and useful Improvements in Bicycles and Motor Drives Therefor, of which the following is a specification.

My invention relates generally to improvements in motor bicycles, and relates more particularly to improvements in motorcycles of the bicycle type.

One object of my invention is to provide a light, durable motorcycle of such construction that it can be operated as an ordinary bicycle or as a motorcycle at the will of the operator, or as may be required in event of engine failure.

Another object of my invention is to provide a bicycle of such construction that it can be equipped with a motor drive, without necessity of altering the bicycle in any way, and with little work upon the part of the operator.

It is also an object of my invention to provide a motor driven bicycle wherein the drive shall act in the central plane of the wheel to the end that objectionable torsional or canting action upon the axle of the drive wheel, prevalent in such detrimental manner in all off-center drives, shall be eliminated, thereby enabling the use of a bicycle of much lighter, simpler, and more inexpensive construction than would otherwise be safe for such purposes.

I also aim to provide a motor power plant, and a means of mounting it in the bicycle frame, in such manner that any vibration set up by the engine is absorbed before it reaches the frame of the bicycle, thereby eliminating all danger of crystallization of the bicycle frame by the rapid succession of blows upon the frame and adding greatly to the comfort of the rider.

It is also an object of my invention to provide a motor bicycle of such construction that the power plant can be quickly removed as a unit from the bicycle frame, and with little labor.

Figure 1:
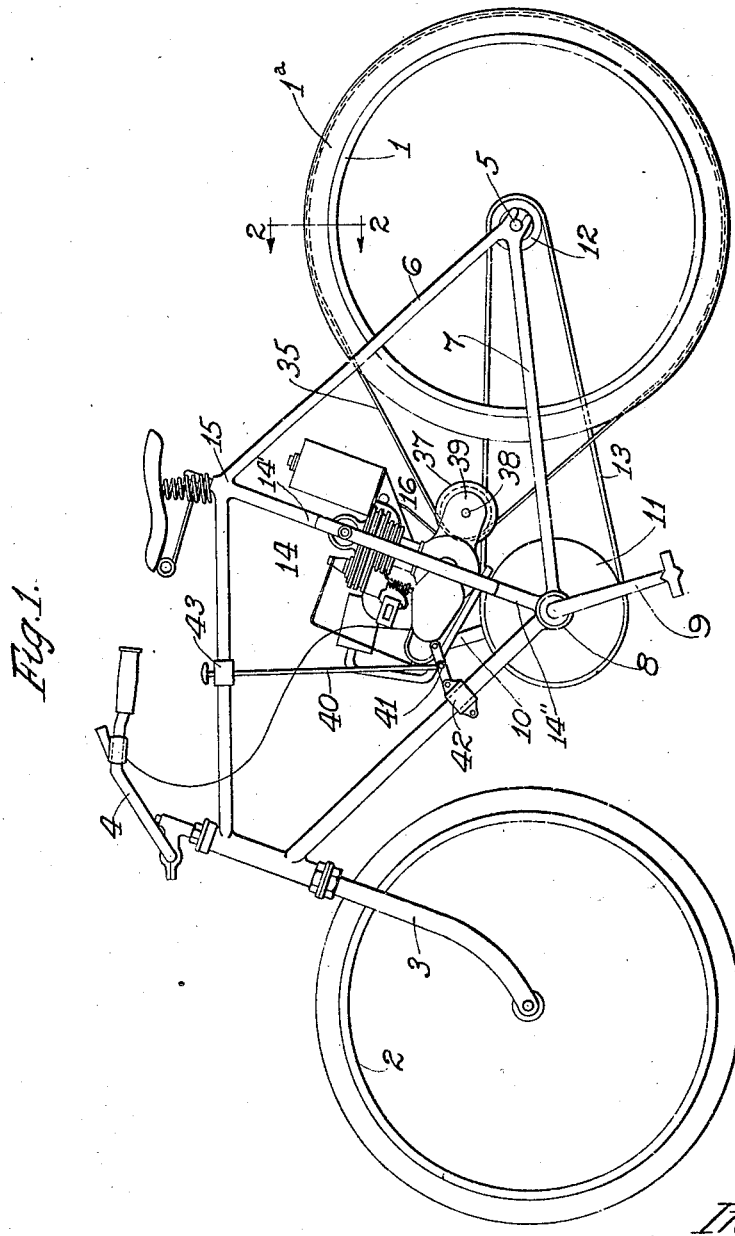
Figure 2:
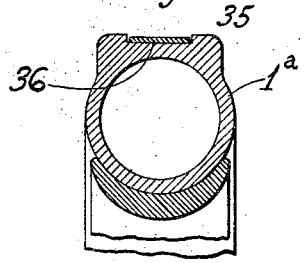
Figure 3:
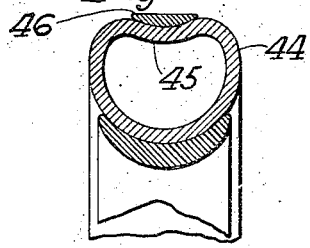
Figure 6:
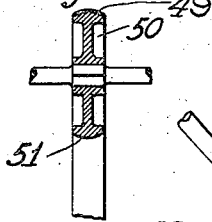
Figure 4:
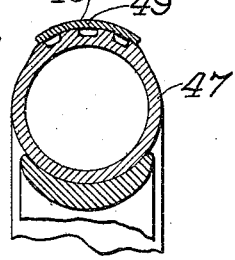
Figure 5:
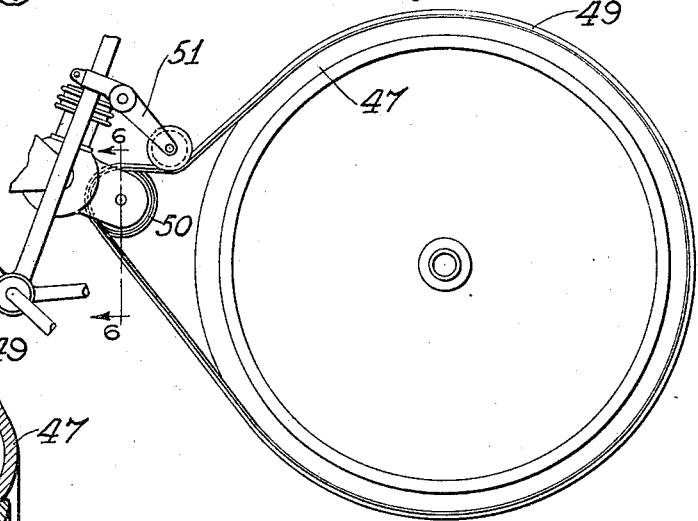

My invention consists generally in the form, construction, arrangement and combination of parts whereby the above named objects together with others that will appear hereinafter are attained and my invention will be more readily understood by reference to the accompanying drawings wherein;

Fig. 1, is a side elevation of a bicycle and motor drive therefor embodying my invention. Fig. 2, is a cross-sectional view, upon an enlarged scale, viewed substantially on the line 2—2 of Fig. 1. Fig. 3, is a view similar to Fig. 2, but illustrating a tire of slightly different form. Fig. 4, is a cross-sectional view showing a drive construction of still another form embodying my invention. Fig. 5, is a detailed view illustrating the drive construction of Fig. 4, in conjunction with related parts of the bicycle frame and motor. Fig. 6 is an enlarged view substantially on the line 6—6 of Fig. 5. Fig. 7 is an enlarged detailed view illustrating the manner in which the power plant is mounted in the bicycle frame. Fig. 8 is a view substantially on the line 8—8 of Fig. 7. Fig. 9, is an enlarged detailed view substantially on the line 9—9 of Fig. 7. Fig. 10 is a cross-sectional view through a wheel showing a modified drive construction embodying my invention. Fig. 11, is a side elevation of the drive shown in Fig. 10. Fig. 12, is a detailed view, partly in section and partly in elevation, of still another drive construction embodying my invention; and Fig. 13 is a detailed view, in elevation, showing the drive construction in Fig. 12 as positioned in relation to the motor.

It has been proposed heretofore to convert a bicycle into a motorcycle in various ways, but the proposals heretofore made have been open to many practical objections, some of which are high centers of gravity; off-center drives; unbalanced construction subjecting light bicycle parts to destruction and torsional strains; difficulties of assembly; and crystallization of the frame due to transmission of engine vibration to frame parts; and general lack of durability.

I shall now describe in detail my novel mechanism which I believe, from practical tests heretofore conducted, overcomes the objections heretofore urged against motor driven bicycles.

1 represents the rear or driving wheel of a bicycle and 2, the front or steering wheel. The bicycle tire 1ª, which will be described in detail hereinafter, is of slightly different construction from the usual bicycle tire. The front wheel 2, is mounted in the customary fork 3, which can be manipulated for steering by turning the handle 4. The rear wheel is supported upon an axle 5, mounted in the cluster formed by the upper and rear fork members 6 and 7. The lower fork member 7 is connected to the crank hanger 8, in which are carried, in usual manner, the crank arms 9 and 10, and the sprocket 11. The rear wheel carries the sprocket 12 which, in this instance, is driven from the sprocket 11 by means of the usual chain 13. The bicycle as thus far described, except for the rear tire, is or may be of usual form, and may be manufactured with the variations prevalent in practice such, for example, as providing a chainless drive instead of the chain drive shown.

The seat mast or frame member 14, is of novel construction in that it serves not only to connect or tie the crank hanger 8 to the seat post fitting 15, but also in that it serves to support and accommodate, centrally, the power plant 16, which in this instance, is an internal combustion engine. The member 14, as here shown, is composed of central end portions 14' and 14'' which are connected respectively to the crank hanger 8 and to the seat post fitting 15. Intermediate its ends the member 14 assumes a yoke-like form having substantial vertical side portions 14$^a$ and 14$^b$ joined above and below by the transverse portions 14$^c$ and 14$^d$. The yoke portion is preferably, though not necessarily, made of a drop forging which lends itself admirably to a light small shape of sufficient strength to withstand all of the forces to which it is subjected in use, and particularly when used in conjunction with my novel "floating" motor support.

Near the upper end of the yoke 14, I provide openings in the side portions for the reception of a bolt 17 on, or from which, the internal combustion engine 16 is suspended. In order to form a good bearing for the bolt 17, the side portions of the yoke are preferably provided with bosses 17' and 17''. By providing additional metal at this point the remainder of the forging, or yoke frame, can be made much lighter than could otherwise be suitable.

Many of the details of the engine 16, need not be described because they may be of usual or desired construction, but the main parts will be designated in order that the completely self-contained construction of the power plant, which I prefer, may be better understood. 18 is the cylinder; 19, the crank case; 20, the magneto; 21, the carburetor; 22 the muffler; and 23 the fuel supply tank. The fuel supply tank is connected to the carburetor by means of a pipe 25.

Upon the upper part of the engine cylinder I cast an integral eye-like bracket or member which is provided with a central flange-like ring 27' and a central opening 28.

As is probably best shown in Figs. 7, 8, and 9, the engine is hung from the frame through the medium of the bolt 17, the sleeve-like member 30 surrounding the bolt 17, and of a length to span the distance between the side members of the yoke 14, and the two spiral spring members 31 and 32. It will be observed that the spiral springs 31 and 32 are held against dislodgment by engagement at one end with the central flange 27' of the ring 27, and at the other end against the flanged ends 33 and 34 of the sleeve or bushing 30. This construction is called or termed a "floating" construction, in that no direct connection is had between the engine and the bicycle frame parts, and for this reason the force of the explosion of the engine, and any vibration set up by the engine when in operation, must travel throughout the length of the spiral springs before it is transmitted to the frame. In fact before that time the force becomes dissipated and is absorbed in the spring. This is an extremely important element especially when it is considered that the bicycle frame is composed of very light tubing. Obviously, since the vibration of the engine cannot be transmitted to the frame, the rider is free from this annoying feature. In this manner not only is the engine "floatingly" mounted but it is also held in such a manner that it can swing in the central drive plane, and only in that plane. It should be noted that I have positioned all of the parts in a symmetrical manner on both sides of the central plane so that the engine is nicely balanced and any tendency to overbalance the bicycle is prevented. The center of gravity of the engine is low, particularly the heavier parts thereof, such as the magneto, fly wheel, gears, and the like. This construction not only stabilizes the vehicle when in motion but also aids materially in adapting a relatively light bicycle frame, which was designed and intended for only relatively slow speeds, to the motor bicycle construction with its higher speed and more constant and severe usage.

The rear wheel in that form of my invention shown in Figs. 1 and 2 is driven by means of a belt 35 which substantially encircles the tire 1$^a$ and which is accommodated in a groove 36 therein. The belt also passes around a drive wheel, 37 which is mounted for rotation upon a shaft or bearing 38 carried in brackets 39, extending from the crank case of the engine. Rotation is imparted to the wheel or pulley 37 by means of a train of gears suitably housed in the engine frame. In order to keep the belt 35 taut, I provide a lever 40 positioned within convenient reach of the rider which when pulled upwardly acts to swing the engine, and the drive pulley 37 carried thereby, from the rear or driving wheel. The lever 40, by which the engine is moved, may be connected to the engine in various ways, but it is preferably so connected that a powerful leverage can be secured thereby conveniently enabling tensioning of the belt. In the present instance, I have illustrated the lever 40 as connected at its lower end to toggle levers 41, which in turn are connected respectively to the engine at one end and to the bracket 42 at the other end which bracket 42 is clamped to the frame of the bicycle in any suitable manner for convenient removal. The upper end of the lever 40, engages a device 43, suitably clamped to the cross bar of the frame and which is constructed to hold the lever in any placed position. Thus when the control lever 40 is pulled upwardly the toggle mechanism 41 is "broken" thereby moving the engine away from the driving wheel and tensioning the belt. If for any reason the belt should become unduly taut, obviously, downward movement of the lever 40 will operate to place sufficient slack in the belt.

In Fig. 3, I have shown a cross section of a tire adapted to the belt drive construction already described. In this instance the tire 44 is especially formed with a depressed tread portion 45 for accommodation on the driving belt 46. The upper surface of the belt 46 is substantially flush with the uppermost parts of the tire tread and in a sense forms a continuation thereof, so that in operation the bicycle rolls upon the tire and upon that part of the belt encircling the tire. This drive can, and may be connected and operated in the same manner as that described with reference to Figs. 1 and 2.

In Figs. 4, 5, and 6, I have illustrated a drive construction which is applicable to bicycle tires of the kind now in general use. Such tires 47, are circular in cross-section and are provided with an outer or tread portion 48.

For the purpose of driving the tire 47 and the wheel upon which it is mounted, I provide an endless belt 49 which belt is somewhat arcuate in cross-section so that it conforms generally to the curved tread of the tire as is well shown in Fig. 4. The belt 49 passes over the drive pulley 50 which pulley is provided with a crowned face 51 to accommodate the curved driving belt 49. The driving belt 49 is maintained in a desired state of tension as by means of the arm and pulley 51 (see Fig. 5). Thus, as the drive pulley 50 receives motion from the engine, rotation of the bicycle drive wheel is obtained, and the bicycle in travelling rolls upon the belt as a tread. Because of the large amount of contact between the belt and the tire there is no danger of slippage even though the parts be wet.

In Figs. 10 and 11, I have shown another drive construction embodying my inventive idea and in this instance I provide a rim 52 for the rear or drive wheel, which is preferably a rolled metal rim, and which is provided with portions 53 and 54 to hold, in spaced relation, two pneumatic tires 55 and 56. Between the two tire portions, the rim section is provided with a central depression 57, which serves to accommodate the driving belt 58. As is shown in Fig. 11, the driving belt 58 passes over the drive pulley of the engine.

In Figs. 12 and 13 I have illustrated still another modification embodying my invention. In this instance, I mount the tire 59 upon the drive wheel rim 60 which is provided with flat side portions 61 and 62, the outer edges of which terminate in outwardly extending flanges 63 and 64, respectively. Mounted in the engine frame and driven thereby is a drive wheel 65 (see Fig. 13). This drive wheel comprises, in this instance, a shaft 66 which is mounted, for rotation, in brackets carried by the engine frame. Mounted to rotate with the shaft 66 will be found two spaced disk-like members 67 and 68 each of which is composed of a member 69 to which is secured a ring of friction material 70, as by means of the face plate 71 and rivets 72. Means are provided (not shown) for forcing the engine and the drive wheels, carried thereby, against the rear or driving wheel of the bicycle thus causing firm frictional contact between the members 67 and 68 and the flat surfaces 61 and 62 of the rim 60. Not only is the bicycle wheel driven in this manner but any tendency thereof to rotate out of its true plane is corrected by engagement of the side flanges 63 and 64 with the respective driving elements 67 and 68.

I claim:

1. A motor bicycle comprising, in combination, a bicycle having a frame including a mast, a motor positioned in an upright manner and substantially in the central vertical plane of the mast, said mast being formed to accommodate said motor, and means arranged in the upper end for yieldingly suspending the motor in said mast.

2. A motor bicycle comprising, in combination, a bicycle frame having a mast formed to accommodate a motor, a motor positioned substantially in the central plane of the mast, and means swingably and yieldingly mounting the motor in the mast for swinging movement longitudinally of the vehicle.

3. Means for yieldingly suspending a motor in an upright position in a vehicle frame embodying therein an eyelike extension on the motor, a plurality of coiled springs, finding seats upon the eye-like extension, and a member extending through the eye-like extension of the motor and having end portions serving to hold said springs in place.

4. Means for yieldingly suspending a motor in a vehicle frame embodying therein an eye-like extension on the motor, a plurality of coiled springs finding seats upon the eye-like extension, and a member extending through the eye-like extension and having end portions serving to hold said springs in place, said centrally disposed member being hollow, and a pivot member carried by the frame and extending through said hollow spring retaining member.

In testimony whereof, I have hereunto set my hand, this 26th day of July, 1919.

ERLE K. BAKER.